US012053426B2

United States Patent
(12) United States Patent
Owen

(10) Patent No.: US 12,053,426 B2
(45) Date of Patent: Aug. 6, 2024

(54) DEVICE FOR MITIGATING MOTION SICKNESS AND OTHER RESPONSES TO INCONSISTENT SENSORY INFORMATION

(71) Applicant: Otolith Sound Inc., Washington, DC (US)

(72) Inventor: Samuel J. Owen, Alexandria, VA (US)

(73) Assignee: Otolith Sound Inc., Washington, DC (US)

( * ) Notice: Subject to any disclaimer, the term of this patent is extended or adjusted under 35 U.S.C. 154(b) by 27 days.

(21) Appl. No.: 17/193,745

(22) Filed: Mar. 5, 2021

(65) Prior Publication Data

US 2022/0040033 A1 Feb. 10, 2022

Related U.S. Application Data

(63) Continuation of application No. 15/980,124, filed on May 15, 2018, now abandoned, which is a (Continued)

(51) Int. Cl.

*A61H 23/02* (2006.01)
*A61H 21/00* (2006.01)
*A61H 23/00* (2006.01)

(52) U.S. Cl.

CPC ............. *A61H 23/02* (2013.01); *A61H 21/00* (2013.01); *A61H 23/00* (2013.01); (Continued)

(58) Field of Classification Search

CPC .... A61H 23/00; A61H 23/02; A61H 23/0218; A61H 23/0236; A61H 23/0245; (Continued)

(56) References Cited

U.S. PATENT DOCUMENTS

| | | | |
|---|---|---|---|
| 2,680,158 | A | 6/1954 | Joachim et al. |
| 3,984,707 | A | 10/1976 | McClintock |

(Continued)

FOREIGN PATENT DOCUMENTS

| | | | |
|---|---|---|---|
| CA | 2248642 | A1 | 4/1999 |
| CN | 1853444 | A | 10/2006 |

(Continued)

OTHER PUBLICATIONS

Beh, S. C. et al., "Damping of Monocular Pendular Nystagmus with Vibration in a Patient with Multiple Sclerosis," Neurology, Apr. 15, 2014; 82(15): 1380-1381.

(Continued)

*Primary Examiner* — Colin W Stuart
(74) *Attorney, Agent, or Firm* — COOLEY LLP

(57) ABSTRACT

Embodiments disclosed herein mitigate motion sickness by disrupting, controlling, or influencing anatomy of the vestibular system. An embodiment may induce vibrations in the vestibular system, including otoliths and/or semicircular canals of the inner ear, causing noisy or unreliable sensory information to be sent to the brain from the vestibular system. Due to the noisy or unreliable quality, the brain, as part of a normal physiological response, may rely less on sensory information from the vestibular system and rely more on other sources, thereby mitigating the motion sickness response, vertigo, vestibular migraines, and other physiological responses to inconsistent sensory information. Vibrations in the vestibular system may be induced by an agitator placed on an individual's head near the vestibular system, or by a transducer placed near the eardrum or directly on an individual's head. Some embodiments may optionally include implantable components in addition to extracorporeal components.

15 Claims, 7 Drawing Sheets

Related U.S. Application Data continuation of application No. 14/867,774, filed on Sep. 28, 2015, now abandoned.

(60) Provisional application No. 62/179,682, filed on May 15, 2015, provisional application No. 62/071,636, filed on Sep. 29, 2014.

(52) U.S. Cl.
CPC ..... *A61H 23/0236* (2013.01); *A61H 23/0245* (2013.01); *A61H 23/0263* (2013.01); *A61H 2201/0157* (2013.01); *A61H 2201/165* (2013.01); *A61H 2201/5058* (2013.01); *A61H 2201/5084* (2013.01); *A61H 2205/027* (2013.01)

(58) Field of Classification Search
CPC ............ A61H 23/0254; A61H 23/0263; A61H 23/008; A61H 2023/002; A61H 2023/0227; A61H 2023/0209; A61H 21/00; A61H 2205/027; A61H 2205/028; A61H 2205/02; A61H 2205/04; A61H 2201/0157; A61H 2201/165; A61H 2201/5058; A61H 2201/5084; A61N 7/00; A61N 2007/0004; A61N 2007/0021; A61N 2007/0026; A61N 2007/0043; A61N 2007/0073; A61N 2007/0078
See application file for complete search history.

(56) References Cited

U.S. PATENT DOCUMENTS

| | | | |
|---|---|---|---|
| 4,222,393 | A | 9/1980 | Hocks et al. |
| 4,354,067 | A | 10/1982 | Yamada et al. |
| 4,495,940 | A | 1/1985 | Takaishi |
| 4,558,703 | A | 12/1985 | Mark |
| 4,813,403 | A | 3/1989 | Endo |
| 5,050,587 | A | 9/1991 | Sagara et al. |
| 5,167,236 | A | 12/1992 | Junker |
| 5,323,468 | A | 6/1994 | Bottesch |
| 5,325,872 | A | 7/1994 | Westermann |
| 5,361,437 | A | 11/1994 | Zhu et al. |
| 5,403,262 | A | 4/1995 | Gooch |
| 5,611,771 | A | 3/1997 | Taylor |
| 5,692,056 | A | 11/1997 | Gardner |
| 5,788,656 | A | 8/1998 | Mino |
| 5,795,287 | A | 8/1998 | Ball et al. |
| 5,966,680 | A | 10/1999 | Butnaru |
| 6,047,074 | A | 4/2000 | Zoels et al. |
| 6,068,590 | A | 5/2000 | Brisken |
| 6,077,237 | A | 6/2000 | Campbell et al. |
| 6,193,677 | B1 | 2/2001 | Cady |
| 6,210,321 | B1 | 4/2001 | Di Mino et al. |
| 6,411,050 | B1 | 6/2002 | Yoshinari et al. |
| 6,443,913 | B1 | 9/2002 | Kania |
| 6,692,428 | B1 | 2/2004 | Kania |
| 7,253,350 | B2 | 8/2007 | Noro et al. |
| 7,442,147 | B2 | 10/2008 | Matsuzaki et al. |
| 7,442,174 | B2 | 10/2008 | Butler |
| 7,626,295 | B2 | 12/2009 | Yamaguchi |
| 7,633,835 | B1 | 12/2009 | Erikson et al. |
| 7,962,217 | B2 | 6/2011 | Merfeld et al. |
| 8,317,848 | B1 | 11/2012 | Webb et al. |
| 8,355,788 | B2 | 1/2013 | Mechlenburg et al. |
| 8,463,389 | B1 | 6/2013 | Oths |
| 8,515,552 | B2 | 8/2013 | Englehart |
| 8,579,796 | B2 | 11/2013 | Winkler |
| 8,801,591 | B1 | 8/2014 | Lasorso, Jr. |
| 8,849,407 | B1 | 9/2014 | Danilov et al. |
| 9,289,349 | B2 | 3/2016 | Doochin et al. |
| 9,999,835 | B2 | 6/2018 | Watson |
| 10,398,897 | B2 | 9/2019 | Owen et al. |
| 10,702,694 | B2 | 7/2020 | Owen et al. |
| 11,284,205 | B2 | 3/2022 | Akers et al. |
| 2001/0051776 | A1 | 12/2001 | Lenhardt |
| 2003/0195588 | A1 | 10/2003 | Fischell et al. |
| 2004/0097839 | A1 | 5/2004 | Epley |
| 2004/0199214 | A1 | 10/2004 | Merfeld et al. |
| 2005/0015027 | A1 | 1/2005 | Kojima |
| 2005/0184601 | A1 | 8/2005 | Kweon et al. |
| 2005/0201574 | A1 | 9/2005 | Lenhardt |
| 2006/0020161 | A1 | 1/2006 | Mageras et al. |
| 2006/0233418 | A1 | 10/2006 | Huang |
| 2007/0026903 | A1 | 2/2007 | Aarts |
| 2007/0041595 | A1 | 2/2007 | Carazo et al. |
| 2007/0149905 | A1 | 6/2007 | Hanna |
| 2008/0036303 | A1 | 2/2008 | Stevens |
| 2008/0036307 | A1 | 2/2008 | Lu et al. |
| 2008/0214973 | A1 | 9/2008 | Von Othegraven |
| 2008/0221489 | A1 | 9/2008 | Madsen et al. |
| 2009/0005713 | A1 | 1/2009 | Podrazhansky et al. |
| 2009/0072636 | A1 | 3/2009 | Gruden |
| 2010/0141248 | A1 | 6/2010 | Suzukawa |
| 2011/0029045 | A1 | 2/2011 | Cevette et al. |
| 2011/0071340 | A1 | 3/2011 | McGuire |
| 2011/0152729 | A1 | 6/2011 | Oohashi et al. |
| 2011/0278962 | A1 | 11/2011 | Hong |
| 2012/0016431 | A1 | 1/2012 | Paul et al. |
| 2012/0033849 | A1 | 2/2012 | Kang |
| 2012/0106774 | A1 | 5/2012 | Saiki |
| 2012/0203309 | A1 | 8/2012 | Englehart |
| 2012/0286765 | A1 | 11/2012 | Heuvel et al. |
| 2012/0302929 | A1 | 11/2012 | Tkachenko |
| 2013/0061736 | A1 | 3/2013 | Wauke |
| 2013/0090520 | A1 | 4/2013 | Redfield et al. |
| 2013/0123889 | A1 | 5/2013 | Katz et al. |
| 2013/0169071 | A1 | 7/2013 | Endo et al. |
| 2013/0184788 | A1 | 7/2013 | Jager et al. |
| 2013/0225915 | A1 | 8/2013 | Redfield et al. |
| 2013/0237746 | A1 | 9/2013 | Veitl |
| 2013/0303953 | A1 | 11/2013 | Lattner |
| 2014/0018713 | A1 | 1/2014 | Elenga et al. |
| 2014/0046230 | A1 | 2/2014 | Winkler |
| 2014/0084710 | A1 | 3/2014 | Endo et al. |
| 2014/0270276 | A1 | 9/2014 | Iwakura et al. |
| 2014/0276193 | A1 | 9/2014 | Doochin et al. |
| 2014/0309718 | A1 | 10/2014 | Smith et al. |
| 2014/0350441 | A1 | 11/2014 | Shafieloo |
| 2014/0363003 | A1 | 12/2014 | Kupershmidt et al. |
| 2015/0018601 | A1 | 1/2015 | Braun |
| 2015/0063611 | A1 | 3/2015 | Hillbratt et al. |
| 2015/0063616 | A1 | 3/2015 | Westerkull |
| 2015/0156581 | A1 | 6/2015 | Efrati |
| 2015/0272817 | A1 | 10/2015 | Knyrim |
| 2015/0282754 | A1 | 10/2015 | Wackym et al. |
| 2015/0297444 | A1 | 10/2015 | Tass |
| 2015/0325027 | A1 | 11/2015 | Herman et al. |
| 2016/0051793 | A1 | 2/2016 | Gibson-Horn |
| 2016/0067099 | A1 | 3/2016 | Hayashi |
| 2016/0089298 | A1 | 3/2016 | Owen |
| 2016/0228771 | A1 | 8/2016 | Watson |
| 2016/0234588 | A1 | 8/2016 | Timothy et al. |
| 2016/0234613 | A1 | 8/2016 | Westerkull |
| 2016/0256347 | A1 | 9/2016 | Zimmermann |
| 2016/0277821 | A1 | 9/2016 | Kunimoto |
| 2017/0135896 | A1 | 5/2017 | Snow |
| 2017/0171677 | A1 | 6/2017 | Norris et al. |
| 2018/0133102 | A1 | 5/2018 | Owen et al. |
| 2018/0185595 | A1 | 7/2018 | Bogan et al. |
| 2018/0250494 | A1 | 9/2018 | Hanbury |
| 2018/0256444 | A1 | 9/2018 | Owen |
| 2018/0264266 | A1 | 9/2018 | Owen et al. |
| 2019/0014425 | A1 | 1/2019 | Liao et al. |
| 2020/0001085 | A1 | 1/2020 | Owen et al. |
| 2021/0321205 | A1 | 10/2021 | Akers et al. |
| 2022/0279292 | A1 | 9/2022 | Akers et al. |

FOREIGN PATENT DOCUMENTS

| | | | |
|---|---|---|---|
| CN | 101801453 | A | 8/2010 |
| CN | 202721792 | U | 2/2013 |
| CN | 103430573 | A | 12/2013 |

(56) References Cited

FOREIGN PATENT DOCUMENTS

| | | | |
|---|---|---|---|
| CN | 104244842 | A | 12/2014 |
| CN | 104490517 | A | 4/2015 |
| CN | 104799999 | A | 7/2015 |
| CN | 104873370 | A | 9/2015 |
| CN | 104873374 | A | 9/2015 |
| CN | 104967935 | A | 10/2015 |
| CN | 205142506 | U | 4/2016 |
| CN | 105536145 | A | 5/2016 |
| DE | 2846859 | A1 | 5/1979 |
| EP | 2779696 | A1 | 9/2014 |
| EP | 3054702 | A1 | 8/2016 |
| JP | 2002065871 | A | 3/2002 |
| JP | 2002159556 | A | 6/2002 |
| JP | 2003180847 | A | 7/2003 |
| JP | 2004186831 | A | 7/2004 |
| JP | 2007007433 | A | 1/2007 |
| JP | 2008092460 | A | 4/2008 |
| JP | 2012165129 | A | 8/2012 |
| KR | 20160007957 | A | 1/2016 |
| WO | WO-9001966 | A1 | 3/1990 |
| WO | WO-0010361 | A2 | 2/2000 |
| WO | WO-02089525 | A2 | 11/2002 |
| WO | WO-2004077658 | A1 | 9/2004 |
| WO | WO-2008058567 | A1 | 5/2008 |
| WO | WO-2009029040 | A1 | 3/2009 |
| WO | WO-2015040832 | A1 | 3/2015 |
| WO | WO-2015143053 | A1 | 9/2015 |
| WO | WO-2018089994 | A1 | 5/2018 |
| WO | WO-2019157443 | A1 | 8/2019 |
| WO | WO-2020090477 | A1 | 5/2020 |

OTHER PUBLICATIONS

Bone Conductor Transducer with Wires—8 Ohm 1 Watt, Product ID: 1674 [Online], Retrieved from the Internet: URL: https://www.adafruit.com/product/1674, Retrieved from the Internet on May 15, 2018, 7 pages.

Dayton Audio BCT-2 45 × 25mm Bone Conducting Transducer 240-612 [Online], Retrieved from the Internet: URL: https://www.newegg.com/Product/Product.aspx?Item=9SIA88E3493965&ignorebbr=1&n, Retrieved from the Internet May 15, 2018, 2 pages.

Dumas, G. et al., "How to perform the skull vibration-induced nystagmus test (SVINT)," European Annals of Otorhinolaryngology, Head and Neck Diseases 133 (2016) 343-348.

Dumas, G. et al., "Skull Vibration-Induced Nystagmus Test in Unilateral Superior Canal Dehiscence and Otosclerosis: a Vestibular Weber Test," Acta Oto-Laryngologica, 2014; 134:588-600.

Dumas, G. et al., "The Skull Vibration-Induced Nystagmus Test of Vestibular Function—A Review," Frontiers in Neurology, Mar. 2017, vol. 8, Article 41, pp. 1-18.

Extended European Search Report for European Application No. 17868920.4, mailed May 8, 2020, 10 pages.

First Office Action for Chinese Application No. 201780083234.9, dated Feb. 3, 2021, 13 pages.

Haybach, P. J., "Meniere's Disease," Vestibular Disorders Association [Online], Retrieved from the Internet: https://vestibular.org/menieres-disease, 4 pages (Jun. 2018).

International Search Report and Written Opinion for International Application No. PCT/US2017/061520, mailed Dec. 18, 2017, 13 pages.

International Search Report and Written Opinion for International Application No. PCT/US2019/017497, mailed Jul. 12, 2019, 21 pages.

International Search Report and Written Opinion for International Application No. PCT/US2020/032693, mailed Sep. 18, 2020, 18 pages.

Invitation to Pay Additional Fees and Partial International Search Report for International Application No. PCT/US2020/032693, mailed Jul. 27, 2020, 12 pages.

Lee, S-U et al., "Head-Shaking and Vibration-Induced Nystagmus During and Between the Attacks of Unilateral Meniere's Disease," Otology & Neurotology, 36:865-872, 2015.

Margolis, R. H. et al., "Acoustic method for calibration of audiometric bone vibrators," J. Acoust. Soc. Am. 131(2):1221-1225, Feb. 2012.

Medium Surface Transducer with Wires—4 Ohm 3 Watt, Product ID: 1785, [Online], Retrieved from the Internet: URL: https://www.adafruit.com/product/1785, Retrieved from the Internet on May 15, 2018, 5 pages.

Notice of Reasons for Rejection for Japanese Application No. 2019-547218, mailed Oct. 27, 2021, 10 pages.

Office Action for European Application No. 17868920.4, mailed Mar. 19, 2021, 5 pages.

Office Action for U.S. Appl. No. 14/867,774, mailed Feb. 22, 2016, 13 pages.

Office Action for U.S. Appl. No. 14/867,774, mailed Jan. 6, 2017, 15 pages.

Office Action for U.S. Appl. No. 14/867,774, mailed Jun. 27, 2017, 16 pages.

Office Action for U.S. Appl. No. 15/481,457, mailed Dec. 13, 2018, 34 pages.

Office Action for U.S. Appl. No. 15/481,457, mailed Jun. 29, 2018, 35 pages.

Office Action for U.S. Appl. No. 15/481,457, mailed Oct. 10, 2019, 35 pages.

Office Action for U.S. Appl. No. 15/481,457, mailed Sep. 1, 2017, 25 pages.

Office Action for U.S. Appl. No. 15/980,124, mailed Mar. 16, 2020, 11 pages.

Office Action for U.S. Appl. No. 15/980,124, mailed Sep. 9, 2020, 15 pages.

Office Action for U.S. Appl. No. 15/982,867, mailed Apr. 4, 2019, 25 pages.

Office Action for U.S. Appl. No. 16/557,217, mailed Nov. 25, 2019, 33 pages.

Office Action for U.S. Appl. No. 16/921,484, mailed Jul. 16, 2021, 12 pages.

Ohki, M. et al., "Vibration-Induced Nystagmus in Patients with Vestibular Disorders," Otolaryngol Head Neck Surg 2003;129:255-258.

Sohmer, H. et al., "Effect of Noise on the Vestibular System—Vestibular Evoked Potential Studies in Rats," Noise & Health, 1999, vol. 2(5):41-51.

Waveform generated by Bone Conducting Transducer 240-612, generated on Apr. 11, 2018, 1 page.

Waveform generated by Dayton Audio BCT-2 Bone Conduction Transducer, generated on Apr. 11, 2018, 1 page.

Waveform generated by Medium Surface Transducer with Wires—4 Ohm 3 Watt, generated on Apr. 11, 2018, 1 page.

Australian Office Action for Application No. AU2017357123, mailed Jun. 7, 2022, 4 pages.

First Office Action for Chinese Application No. CN20198013128, mailed Jan. 7, 2022, 15 pages.

Office Action for Chinese Application No. CN20198013128, mailed Nov. 4, 2022, 10 pages.

Office Action for European Application No. 17868920.4, mailed Mar. 24, 2022, 6 pages.

Office Action for Japanese application No. JP20190547218, mailed Aug. 5, 2022, 7 pages.

Office Action for Japanese Application No. JP20200539096, mailed Nov. 30, 2022, 11 pages.

Second Office Action for Chinese Application No. 201780083234.9, mailed Nov. 19, 2021, 17 pages.

Second Office Action for Chinese Application No. CN20198013128, mailed on Apr. 4, 2023, 10 pages.

Office Action and Search Report for Chinese Application No. CN20208050443 dated Jul. 13, 2023, 12 pages.

Office Action for Australian Application No. AU20190216971 mailed Nov. 24, 2023, 5 pages.

Office Action for Canadian Application No. CA20173043501 dated Sep. 28, 2023, 5 pages.

Office Action for Canadian Application No. CA20193088682 dated Dec. 1, 2023, 4 pages.

(56) References Cited

OTHER PUBLICATIONS

Office Action for Canadian Application No. CA20203140031 mailed Oct. 30, 2023, 3 pages.
Office Action for European Application No. EP20190711180 dated Jun. 27, 2023, 6 pages.
Office Action for European Application No. EP20729543.7 dated Oct. 4, 2023, 7 pages.
Office Action for Japanese Application No. JP20200539096 dated Sep. 13, 2023, 5 pages.
Office Action for Japanese Application No. JP20210568136 dated Feb. 19, 2024, 6 pages.

DEVICE FOR MITIGATING MOTION SICKNESS AND OTHER RESPONSES TO INCONSISTENT SENSORY INFORMATION

CROSS-REFERENCE TO RELATED APPLICATIONS

This application is a continuation of U.S. patent application Ser. No. 15/980,124, entitled "Device for Mitigating Motion Sickness and Other Responses to Inconsistent Sensory Information," filed May 15, 2018, which is a continuation of U.S. patent application Ser. No. 14/867,774, entitled "Device for Mitigating Motion Sickness and Other Responses to Inconsistent Sensory Information," filed Sep. 28, 2015, which claims priority under 35 U.S.C. § 119(e) to U.S. Provisional Patent Application No. 62/179,682, entitled "Device for Mitigating Motion Sickness," filed May 15, 2015, and U.S. Provisional Patent Application No. 62/071,636, entitled "Device to Manipulate the Otolith Organ Using Sound Waves," filed Sep. 29, 2014, the contents of each of which are incorporated herein by reference in their entirety.

FIELD OF THE INVENTION

Embodiments of the present invention relate to systems, devices, and methods for mitigating motion sickness, vertigo, vestibular migraines, and loss of consciousness by disrupting, controlling, or influencing anatomy of the vestibular system.

BACKGROUND

The brain can determine orientation, balance, position, and movement of a body through a combination of signals received from various parts of anatomy, including eyes, ears, and muscles. For example, nerve cells with hair follicles sense movement of endolymph fluid in the vestibular system of the inner ear to determine movement and orientation of the head. Otoliths in the vestibular system of the inner ear sink in the direction of gravity and pull on hair follicles of nerve cells to aid in distinguishing up from down; horizontal and vertical visual patterns received by the eyes can assist with determinations of orientation, balance, and position; and differential strain on opposing neck muscles can help determine head position and orientation. When signals from multiple sources do not match, an individual can develop motion sickness, experience vertigo, vestibular migraines, or even become unconscious. Unmatched orientation, balance, position and movement signals may result from extreme or unfamiliar movement during, for example, travel in cars, trains, airplanes, and other modes of transportation. Unmatched signals may also result from simulated perceived movement during, for example, 3D movies, 3D video games, and virtual reality devices.

In a natural adaptive response, a brain can ignore sensory information provided in signals that are chaotic, not novel, or unintelligible. For example, repetitive vibrations in the vestibular system of the human inner ear decrease the amplitude of electrical signals sent to the cerebellum. However, studies have shown that very high intensities are required in order for sound to affect the vestibular system. See H. Sohmer et al., *Effect of noise on the vestibular system—Vestibular evoked potential studies in rats.* 2 NOISE HEALTH 41-52 (1999). Thus, traditional headphones, earphones, and speakers are not appropriate technology to use for the purpose of mitigating motion sickness response, vertigo, vestibular migraines, and other physiological responses to inconsistent sensory information by affecting anatomy of the vestibular system. These technologies are not designed to deliver such high intensity signals and would harm or disrupt human hearing even if it could be used at intensities that are appropriate to fulfill the purpose of the present invention.

SUMMARY OF THE INVENTION

This summary is provided to introduce certain concepts in a simplified form that are further described below in the Detailed Description of the Embodiments. This summary is not intended to identify key features or essential features of the claimed subject matter, nor is it intended to limit in any way the scope of the claimed invention.

A "noisy" signal from the vestibular system cannot be properly interpreted by the brain, prompting the brain to instead rely on signals from other sources, such as the eyes and muscles. Fewer signals to interpret may allow the brain to determine orientation, balance, position, movement, or a combination thereof, and may reduce the chance that the brain receives unmatched signals. Consequently, this reduces the likelihood that an individual may experience resulting detrimental physiological effects.

Embodiments of the invention can mitigate motion sickness by disrupting, controlling, or influencing anatomy of the vestibular system, including, for example, otoliths, endolymph, and hair follicles. An embodiment of the invention may induce vibrations in the vestibular system, including otoliths and/or semicircular canals of the inner ear, thereby causing noisy or unreliable sensory information in signals sent to the brain from the vestibular system. Due to this noisy or unreliable sensory information, the brain, as part of a normal physiological response, may rely less on signals received from vestibular system and rely more heavily on other sources, thereby mitigating the motion sickness response, vertigo, vestibular migraines, and other physiological responses to inconsistent sensory information. Another embodiment of the invention may induce vibrations in the vestibular system of the inner ear, thereby controlling the positions of otoliths, endolymph, hair follicles or combinations thereof, and, consequently, alter the sensory information in the signal sent from the vestibular system to the brain to mitigate the physiological effects of inconsistent sensory information.

BRIEF DESCRIPTION OF THE DRAWINGS

So the manner in which the above recited summary features of the present invention can be understood in detail, a more particular description of the invention may be had by reference to embodiments, some of which are illustrated in the appended drawings. It is to be noted, however, that the appended drawings illustrate only embodiments of this invention and are therefore not to be considered limiting of its scope, for the invention may admit to other equally effective embodiments.

DESCRIPTION OF THE EMBODIMENTS

Figure 1:
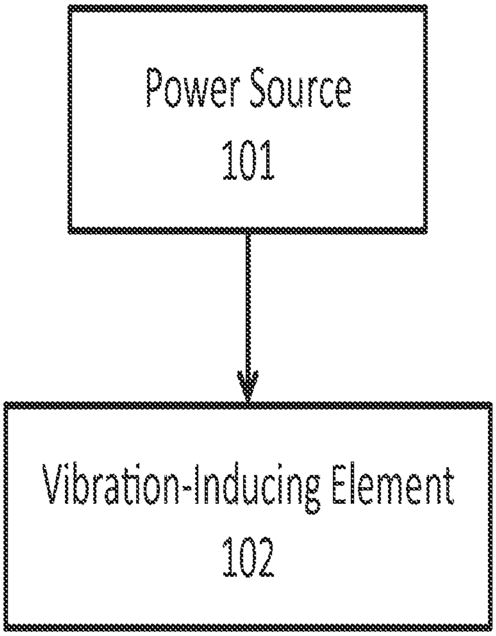
FIG. 1 is an example block diagram of a power source connected to a vibration-inducing element, according to various aspects of an embodiment of the invention.

Embodiments of the present invention will be described with reference to the accompanying drawings, wherein like parts are designated by like reference numerals throughout, and wherein the leftmost digit of each reference number refers to the drawing number of the figure in which the referenced part first appears.

In the context of the embodiments of the invention, the term "infrasound" typically includes vibrations at frequencies between 0 Hz and 20 Hz, but may also include vibrations at frequencies from 10 Hz to 30 Hz.

In the context of the embodiments of the invention, the term "audible" may comprise frequencies of vibrations detectable by an average human or mammalian ear at typical every-day intensities. For an adult human ear, "audible" typically includes vibrations at frequencies between 20 Hz and 20,000 Hz. The audible range for non-human mammals can include sounds in the infrasound range, from 10 Hz up to 20 Hz (e.g., for moles and elephants), as well as sounds in the ultrasound range, from 20,000 Hz and up. For instance, cats and dogs hear up to 40,000 Hz and dolphins can hear sounds up to 160,000 Hz, all in the ultrasound range.

In the context of the embodiments of the invention, the term "neuronal signal" comprises vestibular system evoked potentials carried along the nervous system.

In the context of the embodiments of the invention, the term "power source" may comprise any means for providing power to the invention recognized by a person of ordinary skill in the art, including power generators that are able to generate power without an external power source as well as those that connect to a remote source of power through a USB connector, a power cord, or other appropriate connection line.

In the context of the embodiments of the invention, the term "signal generator" may comprise any means for generating a repeating or non-repeating electronic signals and producing waveforms.

In the context of the embodiments of the invention, the term "vibration-inducing element" may comprise any means recognized by a person of ordinary skill in the art by which vibrations may be induced in the vestibular system of an inner ear, including, for example, transducers, agitators, electrodes, and magnets.

Mechanism of Operation

There are a number of ways in which the present invention may cause the brain to substantially ignore problematic information sources that cause problems relating to motion sickness and other disorders or undesirable responses associated with sensory organs. Embodiments of the invention may include methods and systems that generate signals which alter magnetic fields, stimulate muscle contractions (e.g., using attached or implanted electrodes), or create a steady sound (tone), for the purpose of causing vibration in the vestibular system that lead to a chaotic neuronal signal that causes the brain to ignore or reduce its dependence on problematic sensory signals. Additionally, electrodes may be used to directly act upon the vestibular system or create chaotic neuronal signals (directly) for the same purpose.

By way of example, the signals that act upon the vestibular system may be random (a signal that has no meaning or discernable pattern); they may pick up on outside signals in the auditory range; and they may include an independent signal that is generated by the system or device (without regard to outside noise). In certain embodiments, a signal may produce a controlled countermovement in the vestibular system that counteracts other sensory information or controlled surprise movements. Any signal that creates an appropriate stimulus that acts upon the vestibular system in a manner that results in an appropriate neuronal signal carried to the brain may be used in the present invention.

Embodiments of the invention may decrease dependence on signals comprising sensory information related to orientation, balance, position, movement, or a combination thereof, from the vestibular system by inducing vibrations in the vestibular system. An embodiment of the invention, for example, may induce sufficient vibrations in the vestibular system to create "signal noise" to an extent such that the brain substantially ignores signals from the vestibular system and relies primarily on information provided by other sources to determine orientation, balance, position, movement, or a combination thereof. Another embodiment of the invention may induce vibrations of different intensities and/or frequencies at different time points and/or locations within the vestibular system such that the brain relies primarily on other information sources. Yet another embodiment of the invention may induce vibrations of specific intensities and/or frequencies at specific time points and/or locations within the vestibular system to create an artificial sense of orientation, balance, position, movement, or a combination thereof. And an additional embodiment may induce vibrations such that the amplitude of the signal sent from the vestibular system to the brain (due to the induced vibrations) is greater than the amplitude of signals sent to the brain due to actual sensations of orientation, balance, position, or movement.

Some embodiments of the invention may induce changes in vibration and/or pressure in the vestibular system such that transitory periods occur wherein the brain adapts to changing sensory information in signals, but does not—during that transitory period—also determine orientation, balance, position, movement, or a combination thereof. In this way, embodiments that continuously or intermittently produce changes in vibration and/or pressure in the vestibular system may keep the brain constantly in a transitory state and cause the brain to rely less on the vestibular system to determine orientation, balance, position, movement, or a combination thereof.

Embodiments of the present invention can prevent or reduce motion sickness, vertigo, vestibular migraines, or loss of consciousness by directing the brain to ignore the signals from vestibular system, by introducing and mixing noise (e.g. white noise) with the real acceleration signals generated by the vestibular system, and/or by decreasing the vestibular evoked response.

Embodiments of the invention may utilize any method known by one of ordinary skill in the art to induce vibrations in the vestibular system. For example, an embodiment of the invention may place an agitator (a device that rotates an imbalanced object) on an individual's head near the vestibular system such that vibrations from the agitator induce vibrations in the vestibular system. Another embodiment of the invention may place a transducer (a device that pulsates back and forth) near the eardrum such that vibrations from the transducer induce vibrations in the vestibular system via conduction by the air, eardrum, and bones of the middle ear. Yet another embodiment may place a transducer directly on an individual's head such that vibrations of the transducer induce vibrations in the vestibular system via conduction by the skin, skull, and connective tissue. An additional embodiment of the invention may position an ultrasonic transducer (a device that can focus ultrasonic vibrations to targeted points) such that ultrasonic vibrations focused by the ultrasonic transducer induce vibrations in the vestibular system. Embodiments of the invention may further comprise a sound-cancelling component that cancels all or some audible sounds produced by an external transducer. Such sound-cancelling components may be found in headphones, for example. The sound-cancelling components may also optionally include one or more speakers that are fitted over or around the ears. Users may change the signal frequency though use of an adjustment button or other frequency modulation device incorporated in some embodiments.

Embodiments of the invention may optionally be implantable. Implantable embodiments may have one or more extracorporeal components and one or more implanted components. Extracorporeal components of these embodiments may include, for example, a vibration-inducing element, a power source, and/or a signal generator with an optional amplifier. Implantable embodiments may be positioned, for example, against the mastoid bone, adjacent to the vestibular system, or in the sinus cavity near the inner ear.

Embodiments of the invention may produce vibrations that travel through the air before inducing vibrations in the vestibular system of the inner ear. For example, an embodiment may incorporate a pair of vibration-inducing elements in headphones that rest on the outside portion of the ear, such that vibrations must travel through the air into the ear canal before being able to induce vibrations in the vestibular system of the inner ear. Another example embodiment may incorporate a pair of vibration inducing elements into ear buds that fit into the ear canal, such that vibrations must travel through the air in the ear canal before being able to induce vibrations in the vestibular system of the inner ear.

Embodiments of the invention may produce vibrations that travel through the bone(s) and/or connective tissue of the skull before inducing vibrations in the vestibular system of the inner ear. For example, an embodiment of the invention may dispose a vibration-inducing element directly against the skull, such that vibrations must travel through the bone(s) and/or connective tissue of the skull before being able to induce vibrations in the vestibular system of the inner ear.

Embodiments of the invention may utilize a range of vibrational frequencies, including multiple frequencies simultaneously. An embodiment of the invention, for example, may produce low or ultra-low infrasound frequency vibrations that are below the audible range of frequencies, but are produced at intensities capable of inducing vibrations in the vestibular system. For example, an embodiment may produce vibrations at a frequency of 10, 15, or 18 Hz, which are typically undetectable by the human ear, at intensities strong enough to induce vibrations in the vestibular system of the inner ear. Another embodiment may produce high or ultra-high frequency vibrations that are above the audible range of frequencies for humans, but at intensities capable of inducing vibrations in the vestibular system. For example, an embodiment may produce vibrations at a frequency of 19,000 Hz, which is typically undetectable by the human ear, at intensities strong enough to induce vibrations in the vestibular system of the inner ear. As another example, an embodiment may produce vibrations at a frequency of between 19 KHz and 30 KHz, which are similarly undetectable by the human ear, at intensities strong enough to induce vibrations in the vestibular system of the inner ear. Yet another embodiment may produce vibrations at an audible frequency in addition to vibrations at frequencies above and/or below the audible range of frequencies. For example, an embodiment may produce vibrations at a frequency of 15 Hz, which is typically undetectable by the human ear, at intensities strong enough to induce vibrations in the vestibular system of the inner ear, while simultaneously producing audible vibrations, such as music or speech. Yet another embodiment may produce ultrasonic frequency vibrations capable of inducing vibrations in the vestibular system. Yet another embodiment may produce multiple frequencies of vibration simultaneously, such as the simultaneous production of low and high frequency vibrations, and capable of inducing vibrations in the vestibular system. Embodiments may also mix vibrations within the audible range of frequencies with vibrations outside the audible range of frequencies. Embodiments of the invention may produce constant or intermittent vibrations at one or more frequencies.

Standard headphones, including those involving noise-cancelling technology, do not produce signals of sufficient intensity to produce the vestibular system responses and resultant neuronal signals necessary to produce the desired response in the brain. For instance, certain noise cancelling headphones handle up to 110 dB/mW and may provide up to 100 mW in power. They generally handle frequencies between 40-1,500 Hz (higher frequencies), and direct against using headphones at high volumes, particularly for long periods of time. Use of these types of headphones with a high enough intensity that might effect vibrations in the vestibular system can cause ringing in the ears, and short term or long-term hearing loss. Embodiments of the present invention avoid these problems associated with the use of standard headphones at higher intensities within the audible range.

Embodiments of the invention may use focused ultrasound to induce pressure in the vestibular system of the inner ear. Ultrasound may be focused at a particular point by, for example, a transducer with a concave surface geometry, an acoustic lens, such as a concave horn, or other means recognized by a person of ordinary skill in the art. Pressure exerted in the vestibular system of the inner ear by focused ultrasound may activate sensory nerves in the vestibular system and send signals to the brain. Embodiments may intermittently focus ultrasound in the vestibular system such that the induced pressure results in noisy sensory information in signals sent to the brain.

Embodiments of the invention may produce vibrations of various shapes, such as sine waves, square waves, saw-tooth waves, and triangle waves. Such vibrations and their shapes are known to those of ordinary skill in the art. Square waves generally result in an increase in transducer temperatures.

And, generally square waves, saw-tooth waves, and triangle waves that are used to practice the present invention include higher frequencies.

Embodiments of the invention may utilize acoustic radiation force to move anatomy of the vestibular system. Acoustic radiation force is a phenomenon where vibrational nodes (points of minimal vibration) and antinodes (points of maximal vibration) are formed in a substrate and can inducement movement of objects away from antinodes and toward nodes. Embodiments that utilize acoustic radiation force may induce vibrations such that antinodes push otoliths and/or hair follicles toward nodes. These embodiments may alter the frequency, phase, and intensity of the vibrations to move otoliths and/or hair follicles in desired directions and consequently influence signals transmitted from the vestibular system to the brain to deliver desired sensory information related to orientation, balance, position, movement, or a combination thereof.

Electrodes

Embodiments of the invention may utilize electrical current to mitigate motion sickness or other issues caused by unmatched signals sent to the brain. Embodiments of the invention may utilize electrodes to induce muscular contractions resulting in vibrations of muscles located near the inner ear. Electrodes may, for example, be configured to induce repeated contraction of muscles near the vestibular system thereby inducing vibrations in the vestibular system such that "noisy" sensory information is sent in signals to the brain causing the brain to rely less on the vestibular system to determine orientation, balance, position, movement, or a combination thereof. Electrodes may also be configured to induce precisely controlled contractions of muscles near the vestibular system thereby inducing controlled vibrations in the vestibular system that result in induced sensations relating to orientation, balance, position, movement, or a combination thereof.

Some embodiments of the invention may attach to the skin electrodes configured to induce contraction of muscles near the inner ear, such as the tensor tympani and/or stapedius in the middle ear. Embodiments of the invention may use electrodes attached to the skin at a location and in a manner such that they can induce muscle stimulation (e.g., electrical pulses) near the inner ear. This may include stimulation of the tensor tympani and/or stapedius in the middle ear, as previously noted, causing them to constrict and relax repeatedly and generate mechanical vibrations. By doing this in the vicinity of the inner ear, the vestibular system may detect accelerations caused by mechanical vibrations. The introduced stimulations may be controlled precisely, such that a measurable relationship between the stimulations and the vestibular-evoked response to the brain is detected. This relationship may be characterized using experimental (e.g., empirical or heuristic) or numerical methods. Using the modeled relationship, it is possible to cause the brain to signal a desired virtual acceleration. Alternatively, the actions of the muscles resulting from a set of electrical pulses may be engineered to be highly chaotic such that the signal generated by the vestibular system becomes chaotic, and the brain ignores the chaotic signal. Therefore, responses involving motion sickness, vertigo, vestibular migraines, and loss of consciousness may be reduced or prevented. Prior research has demonstrated that the brain learns to filter out and ignore constant signals, therefore, such constant signals should not be used in the present invention.

In yet another embodiment, electrodes can be placed on the skin to send electrical pulses to the nervous system directly. The electrodes can be placed at a location and in a manner such that at least a portion of the stimulants (electrical signals) directly act upon the signal travel route relating to the vestibular evoked response that travels from the vestibular system to the cerebellum. The disruption induced by the electrical current or pulse may result in "noisy" sensory information and cause the brain to rely less on the vestibular system to determine orientation, balance, position, movement, or a combination thereof. This, in effect, scrambles the signal sent to the brain and the brain, not being able to make sense of the signals being sent, ignores them.

Other embodiments of the invention may be implanted in the skull or include ear electrodes also configured to induce contraction of muscles near the inner ear.

Magnetic Field

Embodiments of the invention may utilize magnetic fields to induce vibrations in, or move anatomy of, the vestibular system of the inner ear by inducing movement of otoliths, endolymph, hair follicles, or other anatomy of the inner ear. Embodiments of the invention may dispose the magnetic field generator on the outside of the ear, within the ear canal, or adjacent to the skull near the ear. Other embodiments may implant the magnetic field generator within the skull or near the inner ear. The magnetic field generator may, for example, be configured to induce vibrations in the vestibular system such that "noisy" sensory information is sent in signals to the brain causing the brain to reduce reliance on the vestibular system to determine orientation, balance, position, movement, or a combination thereof. In further embodiments of the invention, the signal generator directs magnetic field generators to change generated magnetic fields in a controlled manner, causing the vestibular system to experience chaotic acceleration transmitting chaotic signals to the brain.

Embodiments may use magnetic field generators to communicate with the signal generator. The magnetic field generators in the vicinity of the inner ear generate forces to move one or more components of the vestibular system in a controlled manner, in order to create a desired sense of acceleration after the signals are interpreted by the brain. This may also induce sensations of orientation, balance, position, movement, or a combination thereof.

Yet another embodiment may produce magnetic fields that interact with the otoliths, gelatinous membrane, endolymph, or hair cells. By controlling magnetic fields around or inside the inner ear, the position of one or more component of the vestibular system (e.g., the saccule, utricle, or hair cells) is carefully controlled, which leads to a manipulated sensation of acceleration after the signals are interpreted by the brain. Alternatively, magnetic fields are changed in a way that causes the vestibular system to experience chaotic accelerations thus sending a chaotic signal to the brain. The brain ignores the chaotic signal. Therefore, responses involving motion sickness, vertigo, vestibular migraines, and loss of consciousness may be reduced or prevented.

Yet another embodiment may produce magnetic fields that interact with an implanted device such as a small magnet. This interaction may be done discretely to create an artificial sensation of motion or constantly to create vibration in the inner ear and a noisy signal to the brain.

The magnetic fields generated according to the present invention are generally of a very low frequency, for example, a maximum frequency of 5 Hz.

DESCRIPTIONS OF THE FIGURES

FIG. 1 shows a block diagram of a representative motion sickness mitigation system of the present invention. The power source 101 provides the required power to the signal vibration-inducing element 102.

Figure 2:
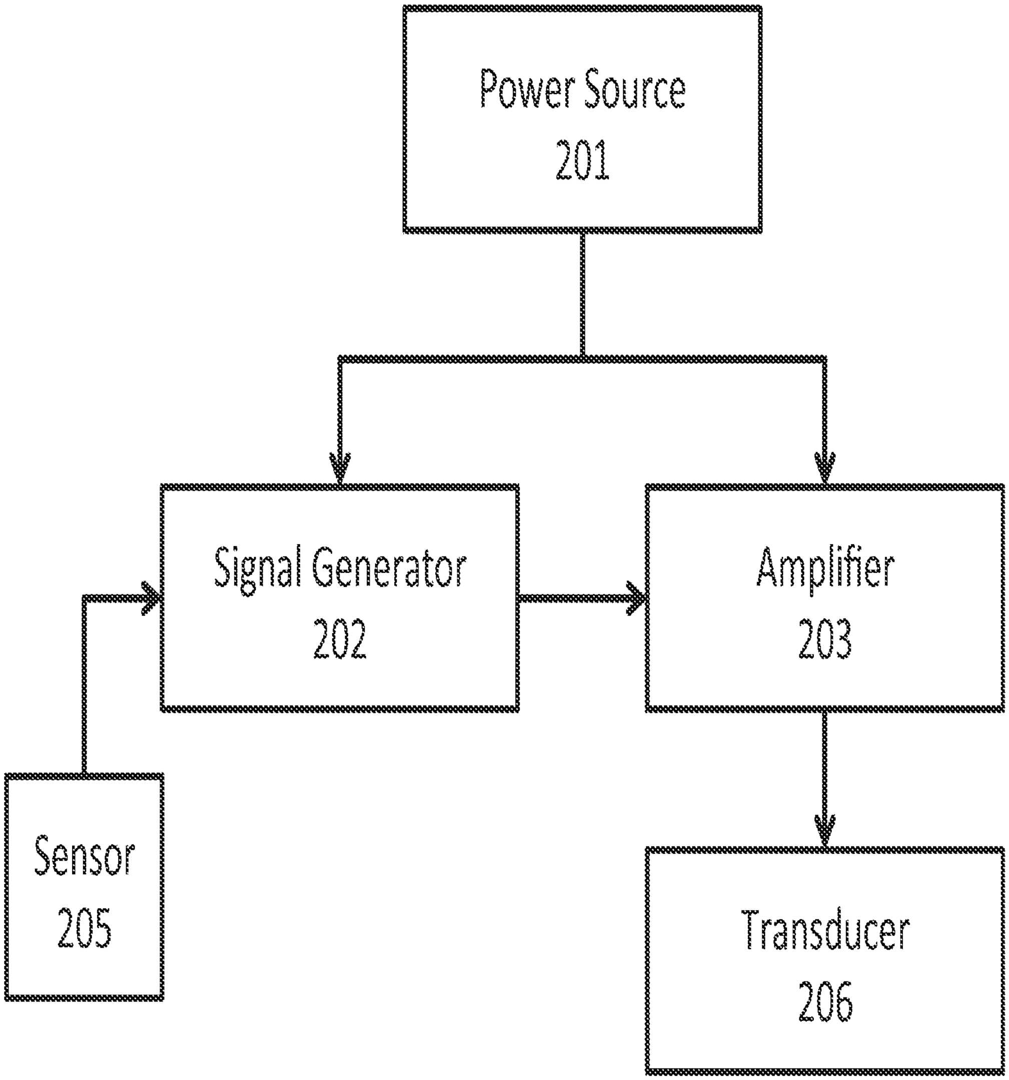
FIG. 2 is an example block diagram of a power source connected to a signal generator and an amplifier, which is further connected to a transducer, according to various aspects of an embodiment of the invention.

FIG. 2 shows a block diagram of another representative motion sickness mitigation system of the present invention. The power source 201 provides power to the signal generator 202 and amplifier 203, which in turn, activates the transducer 206. Sensor 205 may comprise an acceleration sensor and/or an orientation sensor.

Figure 3:
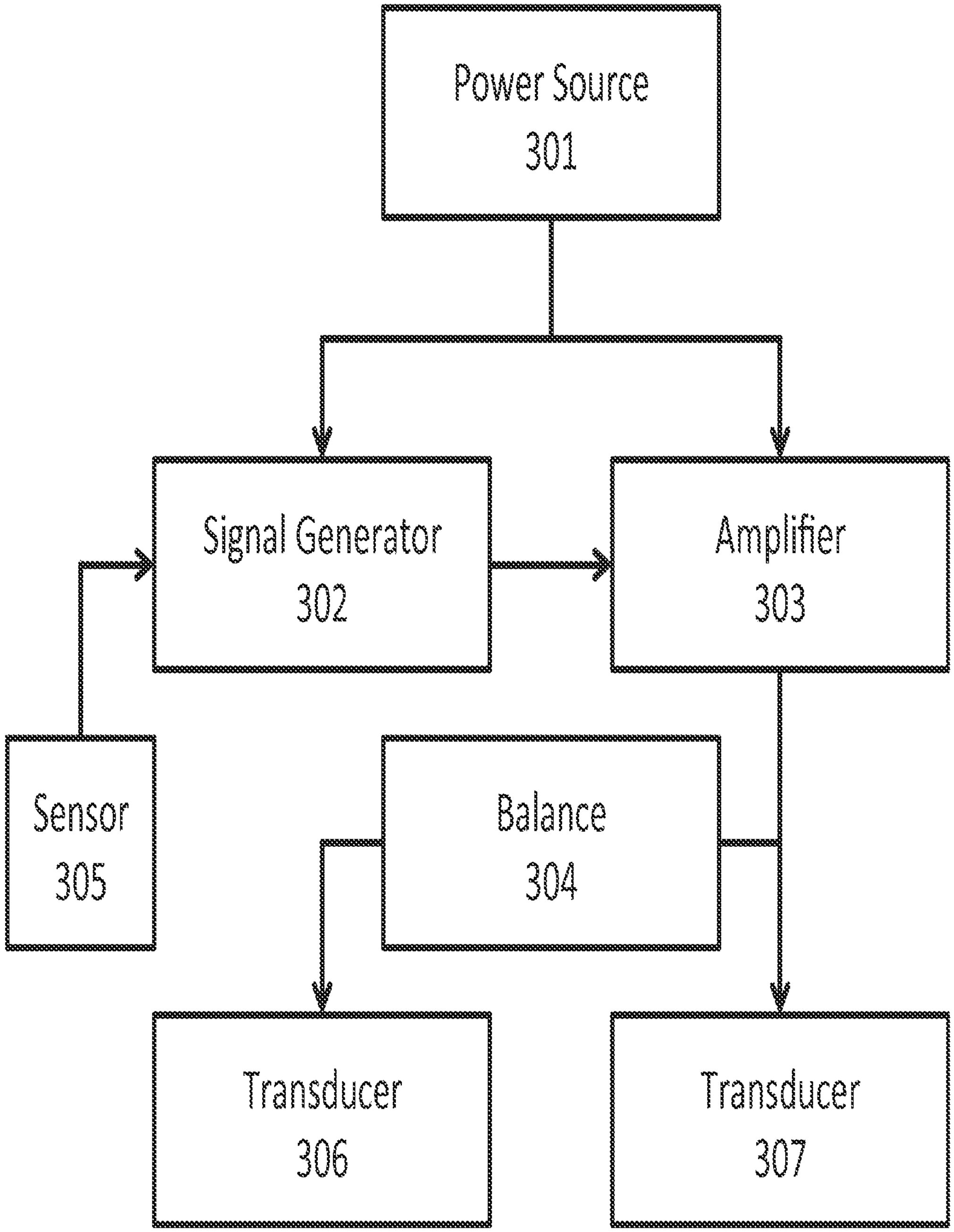
FIG. 3 is an example block diagram of a power source connected to a signal generator and an amplifier, which is further connected to a transducer and a balancer, according to various aspects of an embodiment of the invention.

An alternative embodiment of the system, shown in FIG. 3, optionally includes a balance 304 that distributes the signal created by the signal generator 302 and amplified by the amplifier 303 to two or more transducers 306 and 307, which produce vibrations that may act upon the skull or the vestibular system directly. Sensor 305 may comprise an acceleration sensor and/or an orientation sensor. A balance 304 may alter the amplitude and/or frequency of the electrical signal between the amplifier 303 and a vibration-inducing element such that the mechanical motion of one vibration-inducing element (for example transducer 306) is different from another vibration-inducing element (for example, transducer 307).

Figure 4:
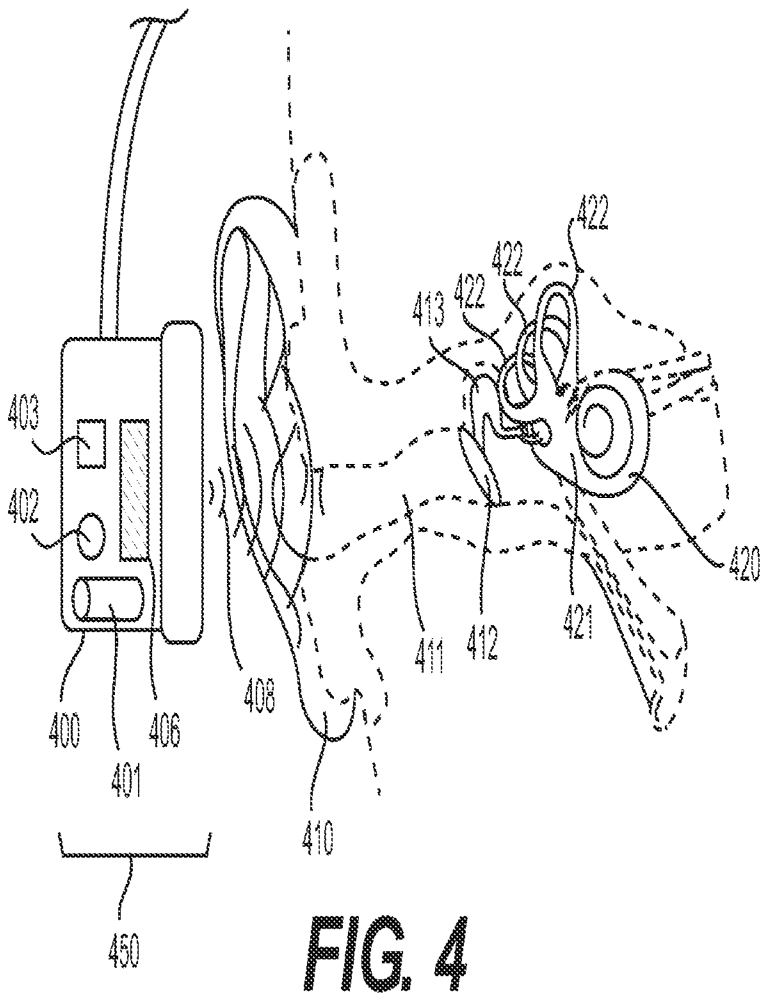
FIG. 4 is an example illustration of a first interaction between an embodiment of the invention and the anatomy of the ear according to various aspects of an embodiment of the invention.

FIG. 4 is an example illustration of a first interaction between an embodiment of the invention and the anatomy of the ear according to various aspects of an embodiment of the invention. Referring to FIG. 4, and according to some of the various embodiments, in a headphone 450 with an earpiece 400 disposed adjacent to an ear 410, a power source 401 supplies electricity to a signal generator 402, which drives an amplifier 403, which powers a transducer 406. The signal generator 402 provides input to the amplifier 403, whose output activates a transducer 406 to produce vibrations 408 that travel into the ear 410 and through the ear canal 411 to induce vibrations in the eardrum 412, bones of the middle ear 413, cochlea 420, vestibule 421, and semicircular canals 422. Vibrations 408 may be at a frequency and intensity to induce vibrations in the vestibular system, but undetectable by the cochlea 420. The induced vibrations in the vestibular system, therefore, may result in "noisy" sensory signals being sent to the brain, causing the brain to rely less on the vestibular system to determine orientation, balance, position, movement, or a combination thereof.

Figure 5:
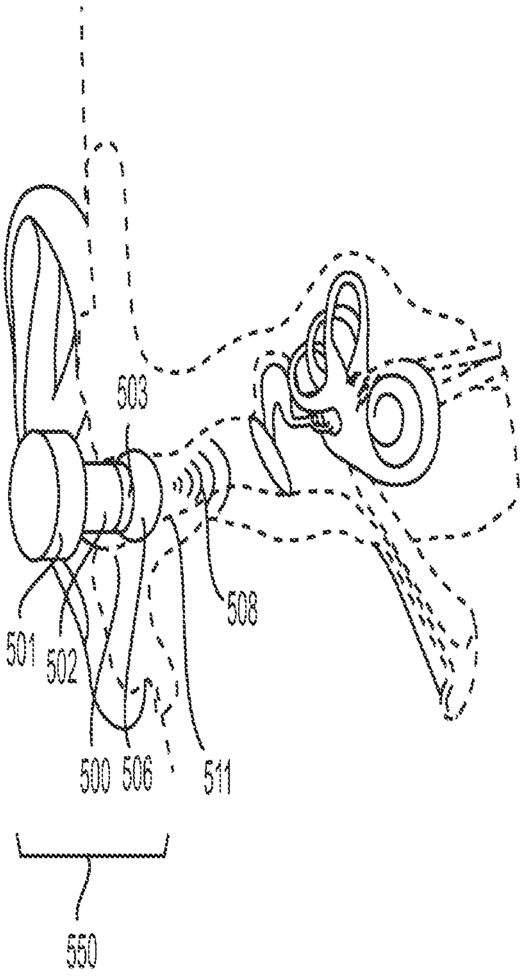
FIG. 5 is an example illustration of a second interaction between an embodiment of the invention and the anatomy of the ear according to various aspects of an embodiment of the invention.

FIG. 5 is an example illustration of a second interaction between an embodiment of the invention and the anatomy of the ear according to various aspects of an embodiment of the invention. Referring to FIG. 5, and according to some of the various embodiments, in an ear bud 550 disposed in an ear canal 511, a power source 501 supplies power to a signal generator 502, which powers a transducer 506. The signal generator 502 produces an electrical signal that travels to the amplifier 503, which activates the transducer 506 to produce vibrations 508 that travel into the ear 500, through the ear canal 511, and induce vibrations in the eardrum, bones of the middle ear, cochlea, vestibule, and semicircular canals. Vibrations 504 may be at a frequency and intensity to induce vibrations in the vestibular system, but undetectable by the cochlea. The induced vibrations in the vestibular system may result in "noisy" sensory signals sent to the brain, causing the brain to rely less on the vestibular system to determine orientation, balance, position, movement, or a combination thereof.

Optionally, the present invention may include a switch that turns on/off the amplifier (or regulates the power or amplitude of the signal) with a frequency related to the time periods $\tau_1$ and $\tau_2$. Further, transducers may introduce ultrasound waves to systems to improve the effectiveness of the system in reducing or eliminating motion sickness, vertigo, or loss of consciousness. A balance can be used to adjust the sound outputs to correlate to the hearing sensitivities of the ears. In other embodiments, more than one switch may be used and switches can be used to turn on/off any or all of the transducers.

Figure 6:
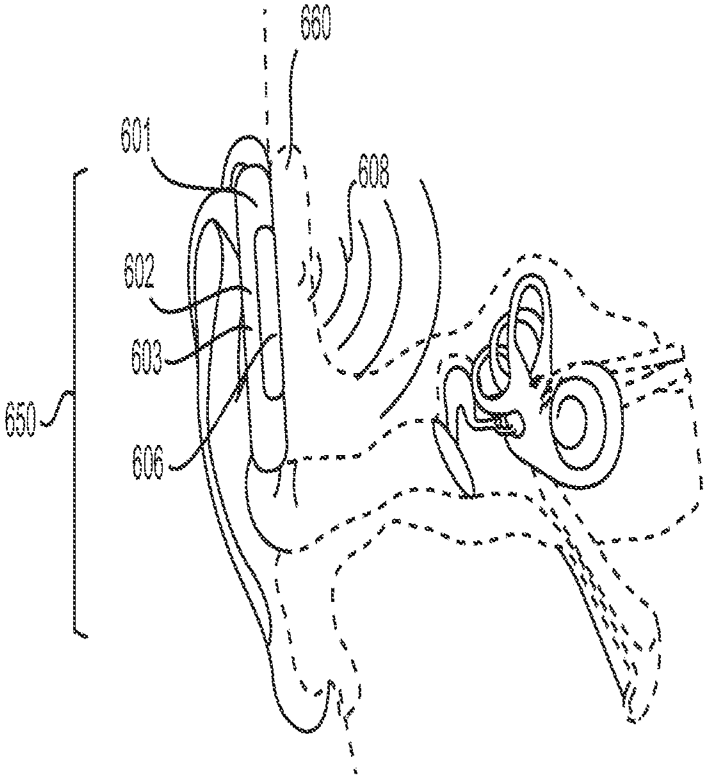
FIG. 6 is an example illustration of a third interaction between an embodiment of the invention and the anatomy of the ear according to various aspects of an embodiment of the invention.

FIG. 6 is an example illustration of a third interaction between an embodiment of the invention and the anatomy of the ear according to various aspects of an embodiment of the invention. Referring to FIG. 6, and according to some of the various embodiments, in a bone-conducting device 650, a power source 601 supplies power to a signal generator 602, an amplifier 603, and optionally a vibration-inducing element such as a transducer 606. The signal generator 602 sends a signal to the amplifier 603, which activates the transducer 606 to produce vibrations 608 that travel through the skull 660 and induce vibrations in the vestibule and semicircular canals. Vibrations 608 may be at a frequency and intensity to induce vibrations in the vestibular system that are undetectable by the cochlea. The induced vibrations in the vestibular system result in "noisy" sensory signals sent to the brain, causing the brain to rely less on the vestibular system to determine orientation, balance, position, movement, or a combination thereof. The bone-conducting device 650 may be disposed on headphone strap, wherein the vibration-inducing transducer 606 may be secured in front or behind each ear next to the skin over the skull. Optionally, a separate ear bud (attached to headphone 650, not shown) may be placed in each ear canal to secure the embodiment on the head of the user.

Figure 7:
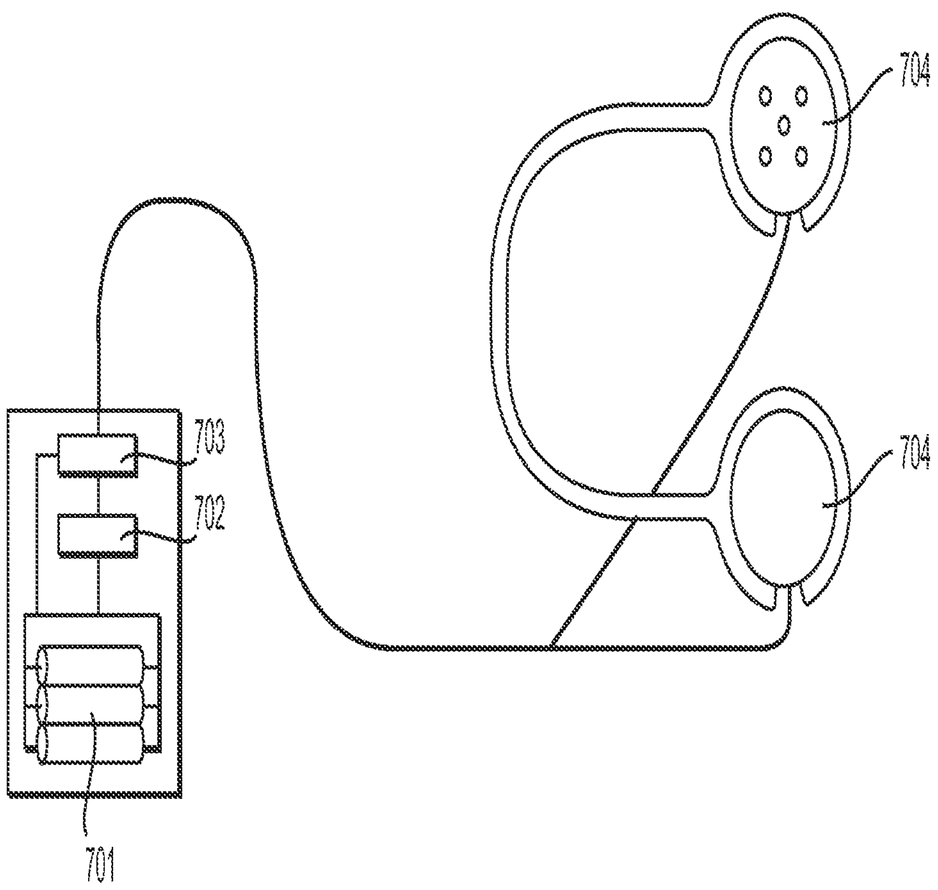
FIG. 7 is an example diagram of a device configuration according to various aspects of an embodiment of the invention.

FIG. 7 is an example diagram of a device configuration according to various aspects of an embodiment of the invention. Referring to FIG. 7, and according to some of the various embodiments, in a control box, a power supply 701 supplies power to a signal generator 702, an amplifier 703 (such as a class D audio amplifier), and optionally a vibration-inducing element 704 (such as a transducer). The power supply 701 may comprise, for example, batteries, another electrical device, an A/C power outlet, a USB port, or a vehicular DC outlet. The signal generator 702 may comprise, for example, a timer, resistors, and capacitors integrated on a printed circuit board, such as a microcontroller, which produces an electrical signal in the form of a wave. The amplifier 703 may comprise, for example, a 3.7 Watt D class mono or stereo amplifier. A vibration-inducing element 704 may comprise, for example, a transducer, such as an 8-Ohm metal cup exciter, or a vibrator, or an agitator. The signal generator 702 may produce an electrical signal that is amplified by an amplifier 703 and converted into mechanical motion by a vibration-inducing element 704 connected to the amplifier 703.

The embodiments involving mechanical motion generated by a vibration-inducing device may produce vibrations that travel into the ear and through the ear canal to induce vibrations in the eardrum, bones of the middle ear, cochlea, vestibule, and semicircular canals. Embodiments may also produce vibrations that travel through bone to induce vibrations in the bones of the middle ear, cochlea, vestibule, and semicircular canals. Vibrations may be at a frequency and intensity to induce chaotic vibrations in the vestibular system undetectable by the cochlea. For example, embodiments may produce vibrations corresponding to a tone having a sine wave pattern at a user-selectable fixed frequency in the infrasound range, such as between 10 Hz and 30 Hz, at an average output power level of between 100 dB and 150 dB. Other embodiments may produce vibrations corresponding to a tone having a square wave, saw-tooth wave, and/or triangle wave pattern at a user-selectable fixed frequency in the infrasound range, such as between 10 Hz and 30 Hz, at an average output power level of between 100 dB and 150 dB.

sine waves, square waves, saw-tooth waves, and triangle waves

Still other embodiments may produce random noise signal at between 15 Hz and 25 Hz, and at approximately 120 dB. The resulting vibrations induced in the vestibular system may result in noisy or chaotic neuronal signals being sent to the brain, causing the brain to rely less on the vestibular system to determine orientation, balance, position, movement, or a combination thereof.

Embodiments of the invention may further comprise a sound-cancelling component that cancels all or some audible sounds produced by a vibration-inducing element, separate battery packs to power the amplifier and microcontroller, and sound-cancelling components that are built onto a single headphone. In some embodiments, the microcontroller may send a 3.3 V digital signal (square wave) at approximately 30 Hz to the amplifier's line-in (with the negative tied to the battery's ground). In other embodiments, the microcontroller may send a sine wave signal to the amplifier.

Applications of Some of the Embodiments

Embodiments of the invention intended for medical use may, for example, induce vibrations of the vestibular system to disrupt sensory information sent to the brain or induce movement of anatomy in the vestibular system in order to improve patient stability. Embodiments may be attached to or incorporated in medical devices such as, for example, hearing aids and cochlear implants. Other embodiments may be implanted in patients to help alleviate problems associated with motion sickness, balance, vestibular migraines, or vertigo.

Embodiments of the invention intended for use with movies, video games, or virtual reality devices may, for example, induce movement of the anatomy of the vestibular system to simulate sensory information regarding orientation, balance, position, movement, or a combination thereof, consistent with visuals presented by the movies, video games, or virtual reality devices. Another example embodiment may induce vibrations in the vestibular system such that the brain substantially ignores sensory information in signals from the vestibular system.

Embodiments of the invention intended for use in vehicles may, for example, comprise a helmet or headset with an integrated transducer or agitator capable of inducing vibrations in in the vestibular system. The transducer or agitator may be powered by an independent power source, such as a battery built into the helmet or headset, or may be plugged into a power source associated with the vehicle. The transducer or agitator may be integrated with audio components typically present in the helmet or headset, or may be attached as a separate module. Other embodiments may comprise speakers attached to or integrated in the body of the vehicle that produce low frequency vibrations at an intensity sufficient to travel through the space between the speakers and the intended target(s) and induce vibrations in the vestibular system(s) of the target(s). Yet other embodiments may comprise transducers or agitators integrated into headrests of the vehicle capable of inducing vibrations in the vestibular systems of the driver and passengers of the vehicle.

Embodiments of the invention may induce specific vibrations or movement of the anatomy of the vestibular system based on signals received from external sensors. For example, embodiments may wirelessly receive acceleration information from sensors built into the device, a suit, or a vehicle and accordingly vary the frequency, power and/or amplitude of the produced vibrations so as to induce neuronal vibrations in the vestibular system to disrupt sensory information sent to the brain or induce movement of anatomy in the vestibular system to counteract movement of the anatomy of the vestibular system induced by movement sensed by the sensors. Another example embodiment may induce vibrations or movement of the of the anatomy of the vestibular system based on signals received from health-monitoring sensors, such as a heart rate sensor, blood pressure sensor, or an electroencephalogram.

Embodiments of the invention may comprise an interface for a computing device, such that vibrations are induced based on signals received from the computing device. For example, an embodiment of the invention may interface with a virtual reality device, such that vibrations are induced when the virtual reality device is in use. Another embodiment of the invention may produce vibrations only when visuals displayed by a virtual reality device could be interpreted by a brain as movement of a user.

Additional embodiments of the invention may be used by fighter pilots to counteract the external stimuli received during flight relating to g-forces and aerial maneuvers performed during flight. For instance, fighter pilots may use helmets comprising the device of the present invention to filter out undesirable signals or generate chaotic signals that cause the brain to ignore them.

Embodiments of the invention may be used with animals. Many animals suffer from motion sickness for primarily the same reasons as humans. Consequently, embodiments of the invention may be used to mitigate motion sickness and other responses to inconsistent sensory information in animals in substantially similar ways to humans. For example, one embodiment of the invention may comprise speakers mounted to the interior of train cars or trailers that produce low frequency vibrations at an intensity sufficient to travel through the space between the speakers and the animals and induce vibrations in the vestibular systems of the animals. Another embodiment of the invention may comprise headphones or a similarly head-mountable device that produces low frequency vibrations at intensities sufficient to induce vibrations in the vestibular systems of an animal wearing the device. Another embodiment may comprise a helmet that includes the device of the present invention. A person of ordinary skill in the art will recognize that the frequencies of the vibrations produced may be adjusted so as fall outside the range of frequencies detectable by the ears of the target animal(s).

In this specification, "a" and "an" and similar phrases are to be interpreted as "at least one" and "one or more." References to "an" embodiment in this disclosure are not necessarily to the same embodiment.

While various embodiments have been described above, it should be understood that they have been presented by way of example, and not limitation. It will be apparent to persons skilled in the relevant art(s) that various changes in form and detail can be made therein without departing from the spirit and scope of the present invention. In fact, after reading the above description, it will be apparent to one skilled in the relevant art(s) how to implement alternative embodiments that have not been explicitly described in the specification. Thus, the disclosed and described embodiments are not intended to limit the scope or the teachings associated with the present invention. They are designed to teach and explain to a person of ordinary skill in the relevant art how to make and use it.

In addition, it should be understood that any figures that highlight any functionality and/or advantages, are presented for example purposes only. The disclosed architecture is sufficiently flexible and configurable, such that it may be utilized in ways other than that shown. For example, certain constituent elements listed in any diagrams may be re-ordered or only optionally used in some embodiments.

Further, the purpose of the Abstract of the Disclosure is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract of the Disclosure is not intended to be limiting as to the scope in any way.

Finally, it is the applicant's intent that only claims that include the express language "means for" or "step for" be interpreted under 35 U.S.C. 112 as a means-plus-function claim type. Claims that do not expressly include the phrase "means for" or "step for" are not to be interpreted as means-plus-function claims.

The invention claimed is:

1. A device for disrupting a vestibular system of a patient, comprising:

a power source;

a signal generator connected to the power source, the signal generator configured to generate a signal waveform; and a vibration-inducing element connected to the signal generator, the vibration-inducing element configured to be activated by the signal waveform generated by the signal generator to generate physical vibrations based on the signal waveform, the physical vibrations having an intensity between 100 dB and 150 dB, the device configured to be secured to contact the patient behind an ear of the patient against skin over a portion of a skull of the patient, the vibration-inducing element, when the device is secured to contact the patient over the portion of the skull of the patient, being configured to transmit the physical vibrations in a direction toward the skull such that the physical vibrations travel through bone of the skull to otoliths, endolymph, hair follicles, or semicircular canals of the vestibular system of the patient to induce vibrations therein and treat a physiological condition evoked by the vestibular system.

2. The device of claim 1, wherein the signal waveform has a frequency between 10 Hz and 30 Hz.

3. The device of claim 1, wherein the power source is a battery.

4. The device of claim 1, further comprising an electrical port for connecting to an external power supply.

5. The device of claim 1, wherein the signal generator includes an amplifier configured to amplify the signal waveform prior to transmitting the signal waveform to the vibration-inducing element.

6. The device of claim 1, further comprising a controller configured to control the signal generator to vary an output power level of the signal waveform based on adjustments by the patient.

7. The device of claim 1, further comprising an acceleration sensor; and a controller configured to control the signal generator to vary an output power level of the signal waveform in response to a change in acceleration sensed by the acceleration sensor.

8. The device of claim 1, further comprising an orientation sensor; and a controller configured to control the signal generator to vary an output power level of the signal waveform in response to a change in orientation of the device sensed by the orientation sensor.

9. The device of claim 1, wherein the device is configured to be attached to or incorporated into a helmet, headset, or headphone.

10. The device of claim 1, wherein the vibration-inducing element includes:

a magnetic field generator configured to generate a magnetic field based on the signal waveform generated by the signal generator.

11. The device of claim 1, wherein the physiological condition includes at least one of: motion sickness, vertigo, vestibular migraines, and loss of consciousness.

12. The device of claim 1, further comprising:

a sensor configured to measure movement associated with the device; and a controller configured to control the signal generator to vary a frequency, a power, or an amplitude of the physical vibrations based on information indicative of the movement measured by the sensor.

13. The device of claim 1, further comprising:

a sensor configured to monitor health information associated with the user, the health information including at least one of: a heart rate, blood pressure, or brain activity; and a controller configured to control the device to vary a frequency, a power, or an amplitude of the physical vibrations based on the health information.

14. A device, comprising:

a power source;

a signal generator connected to the power source and configured to generate a signal waveform;

a magnetic field generator positionable adjacent to a skull of a patient above a bottom of an ear of the patient, the magnetic field generator configured to generate a magnetic field in response to receiving the signal waveform; and a magnet configured to vibrate in response to the magnetic field to generate one or more physical vibrations that are applied in a direction toward the skull and transmittable through bone of the skull to otoliths, endolymph, hair follicles, or semicircular canals of a vestibular system of the patient to induce vibrations in the vestibular system and treat a physiological condition evoked by the vestibular system, the one or more physical vibrations having an intensity between 100 dB and 150 dB.

15. A method, comprising:

positioning a vibration-inducing element against a mastoid bone of a skull of a patient;

supplying power from a power source to a signal generator to generate a signal waveform;

activating the vibration-inducing element coupled to the signal generator using the signal waveform to generate one or more physical vibrations having an intensity and a frequency sufficient to induce vibrations at a vestibular system of the patient, the intensity of the one or more physical vibrations being between 100 dB and 150 dB; and applying the one or more physical vibrations to the portion of the head in a direction toward the skull such that the one or more physical vibrations are conducted through bone of the skull to otoliths, endolymph, hair follicles, or semicircular canals of the vestibular system of the patient to induce the vibrations therein and treat a physiological condition evoked by the vestibular system.

* * * * *